United States Patent
Kong et al.

(10) Patent No.: US 9,766,398 B2
(45) Date of Patent: Sep. 19, 2017

(54) OPTICAL APPARATUS

(71) Applicant: Samsung Electronics Co., Ltd., Suwon-si, Gyeonggi-do (KR)

(72) Inventors: Duanhua Kong, Suwon-si (KR); Seong-gu Kim, Pyeongtaek-si (KR); Hyun-il Byun, Seongnam-si (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 15/259,950

(22) Filed: Sep. 8, 2016

(65) Prior Publication Data
US 2017/0082800 A1    Mar. 23, 2017

(30) Foreign Application Priority Data
Sep. 18, 2015   (KR) .................. 10-2015-0132604

(51) Int. Cl.
| | | |
|---|---|---|
| G02B 6/12 | (2006.01) | |
| G02B 6/34 | (2006.01) | |
| G02B 6/124 | (2006.01) | |
| G02B 6/122 | (2006.01) | |
| G02B 6/30 | (2006.01) | |

(52) U.S. Cl.
CPC .......... *G02B 6/124* (2013.01); *G02B 6/1228* (2013.01); *G02B 6/305* (2013.01); *G02B 6/34* (2013.01); *G02B 2006/12157* (2013.01)

(58) Field of Classification Search
None
See application file for complete search history.

(56) References Cited

U.S. PATENT DOCUMENTS

| | | |
|---|---|---|
| 6,285,813 B1 | 9/2001 | Schultz et al. |
| 7,171,080 B2 | 1/2007 | Rausch |
| 7,184,625 B2 | 2/2007 | Gunn, III et al. |
| 7,397,987 B2 | 7/2008 | Witzens et al. |
| 7,643,709 B2 | 1/2010 | Van Laere et al. |
| 8,625,942 B2 | 1/2014 | Na et al. |

(Continued)

FOREIGN PATENT DOCUMENTS

KR    10-2016-0044685    4/2016

OTHER PUBLICATIONS

Vermeulen D. et al., "High-efficiency fiber-to-chip grating couplers realized using an advanced CMOS-compatible Silicon-On-Insulator platform," Optics Express, vol. 18, No. 17, Aug. 16, 2010, pp. 18278-18283.

*Primary Examiner* — Jerry Rahll
(74) *Attorney, Agent, or Firm* — Myers Bigel, P.A.

(57) ABSTRACT

An optical apparatus includes an optical waveguide located on a substrate and including a guiding portion and a taper portion, and a grating pattern located on the substrate. The grating pattern includes a plurality of low refractive index portions and a plurality of high refractive index portions, which are alternately arranged in a first direction parallel to a top surface of the substrate. Each of the plurality of high refractive index portions includes a curved inner sidewall and a curved outer sidewall having curvatures defined by circular paths. The inner sidewall and the outer sidewall of at least one of the plurality of high refractive index portions have a first focus position. The inner sidewall or the outer sidewall of at least one of the plurality of high refractive index portions or a sidewall of the taper portion has a second focus position different from the first focus position.

20 Claims, 17 Drawing Sheets

(56) References Cited

U.S. PATENT DOCUMENTS

| | | | |
|---|---|---|---|
| 9,128,241 B2* | 9/2015 | Baets | G02B 6/124 |
| 2004/0156589 A1* | 8/2004 | Gunn, III | G02B 6/12004 |
| | | | 385/37 |
| 2009/0290837 A1* | 11/2009 | Chen | G02B 6/34 |
| | | | 385/37 |
| 2010/0092128 A1 | 4/2010 | Okayama | |
| 2014/0314374 A1* | 10/2014 | Fattal | G02B 6/124 |
| | | | 385/33 |

* cited by examiner

OPTICAL APPARATUS

CROSS-REFERENCE TO RELATED APPLICATION

This application claims the benefit of Korean Patent Application No. 10-2015-0132604, filed on Sep. 18, 2015, the disclosure of which is incorporated by reference herein in its entirety.

BACKGROUND

The inventive concept relates to an optical apparatus, and more particularly, to an optical apparatus including a grating coupler.

To embody high-speed, downscaled electronic devices, it is necessary to increase a signal transmission rate in semiconductor devices included in the electronic devices. Since electric signals are transmitted through interconnections, such as copper (Cu) wires, there is a limit to increasing the signal transmission rate. Thus, a signal transmission method using optical signals has been proposed.

SUMMARY

The inventive concept provides an optical apparatus, which may minimize optical loss due to back reflection during a process of transmitting and receiving optical signals.

According to an aspect of the inventive concept, there is provided an optical apparatus including an optical waveguide located on a substrate. The optical waveguide includes a guiding portion and a taper portion. A grating pattern is located on the substrate on one side of the taper portion. The grating pattern includes a plurality of low refractive index portions and a plurality of high refractive index portions, which are alternately arranged in a first direction parallel to a top surface of the substrate. Each of the plurality of high refractive index portions includes a curved inner sidewall and a curved outer sidewall having curvatures defined by circular paths. The inner sidewall and the outer sidewall of at least one of the plurality of high refractive index portions have a first focus position. The inner sidewall or the outer sidewall of at least one of the plurality of high refractive index portions or a sidewall of the taper portion has a second focus position that is different from the first focus position.

According to another aspect of the inventive concept, there is provided an optical apparatus including an optical waveguide on a substrate. The optical waveguide includes a guiding portion having a centerline defining a first direction and a taper portion including a curved sidewall. A grating pattern is on the substrate. The taper portion is between the guiding portion and the grating pattern. The grating pattern includes a plurality of low refractive index portions and a plurality of high refractive index portions alternately arranged in the first direction. Each of the plurality of high refractive index portions includes a curved inner sidewall and a curved outer sidewall. At least one inner sidewall and at least one outer sidewall of at least one of the plurality of high refractive index portions define a first focus position at a radius of curvature thereof. The sidewall of the taper portion defines a second focus position that is spaced apart from the first focus position at a radius of curvature thereof.

According to another aspect of the inventive concept, there is provided an optical apparatus including an optical waveguide located on a substrate. The optical waveguide includes a guiding portion and a taper portion. The taper portion includes a curved sidewall. A grating pattern is located on the substrate on the sidewall of the taper portion. The grating pattern includes a plurality of low refractive index portions and a plurality of high refractive index portions, which are alternately arranged in a first direction parallel to a top surface of the substrate. Each of the plurality of high refractive index portions includes a curved inner sidewall and a curved outer sidewall. At least one inner sidewall and at least one outer sidewall of at least one of the plurality of high refractive index portions have a first focus position. The first focus position is located at an interface between the guiding portion and the taper portion. The sidewall of the taper portion has a second focus position that is different from the first focus position. The second focus position may be located in one of the guiding portion and the taper portion.

According to another aspect of the inventive concept, there is provided an optical apparatus including a light source, an optical fiber, an optical waveguide including a guiding portion and a taper portion, and a grating pattern located on one side of the optical waveguide. The grating pattern is configured to diffract light transmitted from the optical fiber through the taper portion to confine light within the guiding portion. The grating pattern includes a plurality of low refractive index portions and a plurality of high refractive index portions which are alternately arranged. Each of the plurality of high refractive index portions includes a curved inner sidewall and a curved outer sidewall. The inner sidewall or the outer sidewall of at least one of the plurality of high refractive index portions or a sidewall of the taper portion has a focus position located in the taper portion or in the guiding portion.

BRIEF DESCRIPTION OF THE DRAWINGS

Example embodiments of the inventive concept will be more clearly understood from the following detailed description taken in conjunction with the accompanying drawings in which.

DETAILED DESCRIPTION

The inventive concept will now be described more fully hereinafter with reference to the accompanying drawings, in which embodiments of the inventive concept are shown. This inventive concept may, however, be embodied in different forms and should not be construed as limited to the embodiments set forth herein. Rather, these embodiments are provided so that this disclosure is thorough and complete and fully conveys the scope of the inventive concept to one skilled in the art.

Figure 1:
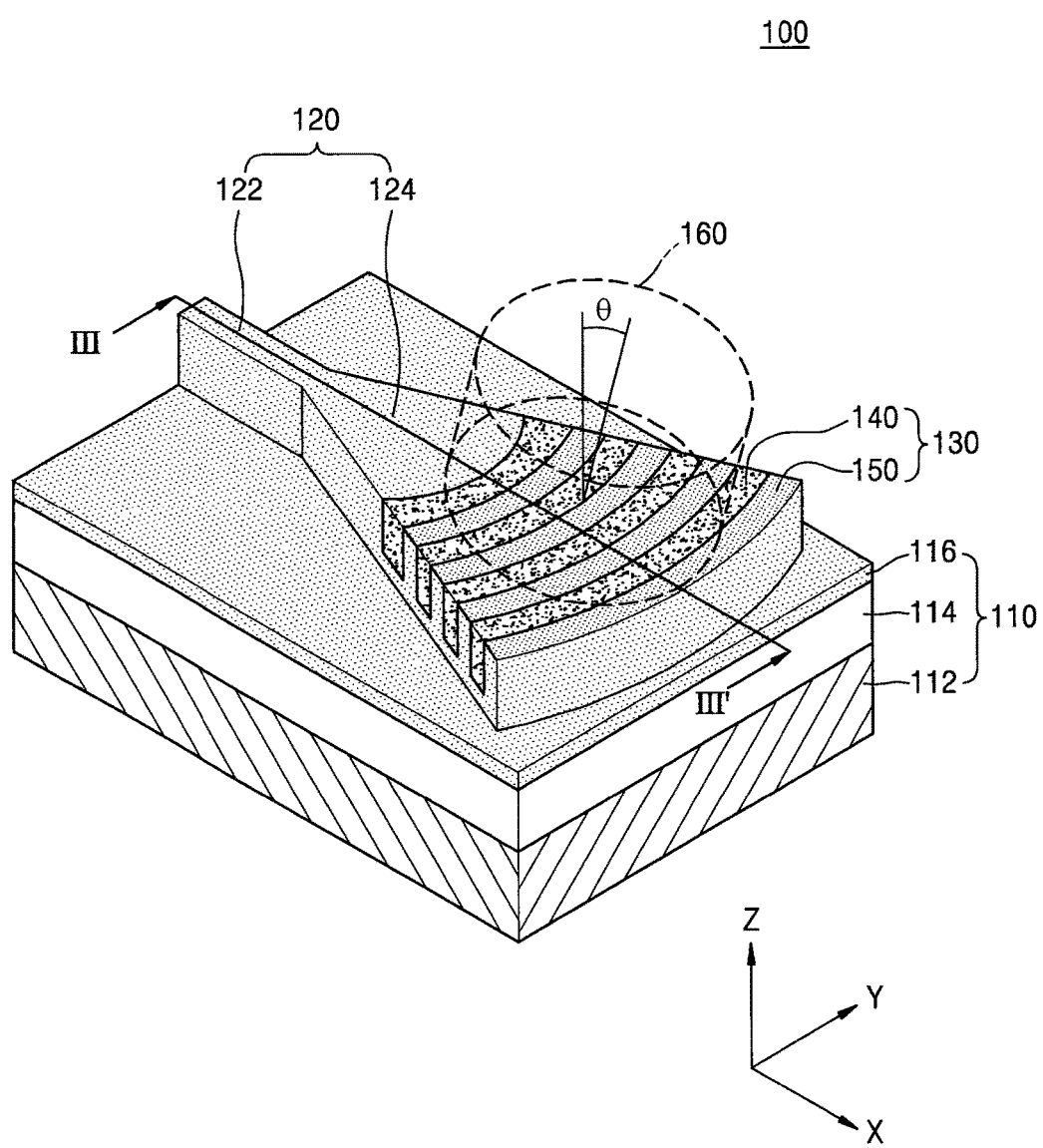
FIG. 1 is a perspective view of an optical apparatus according to example embodiments.
Figure 2:
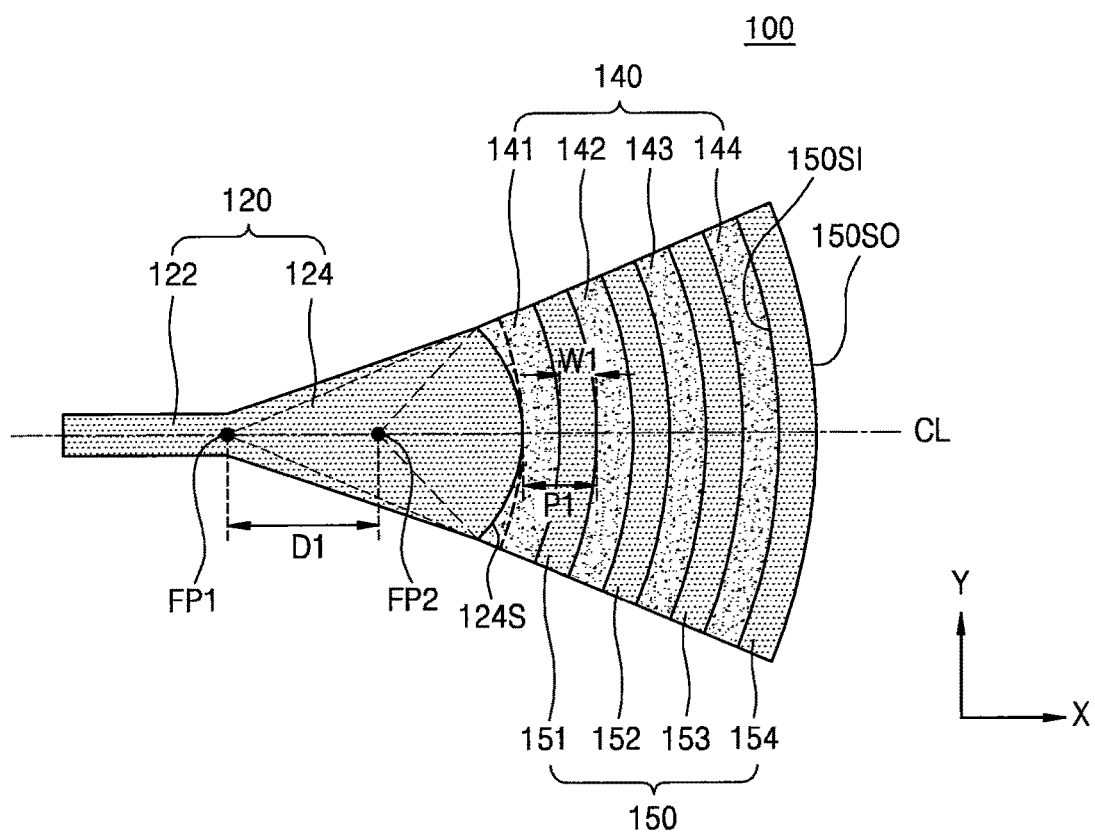
FIG. 2 is a plan view of the optical apparatus shown in FIG. 1.
Figure 3:
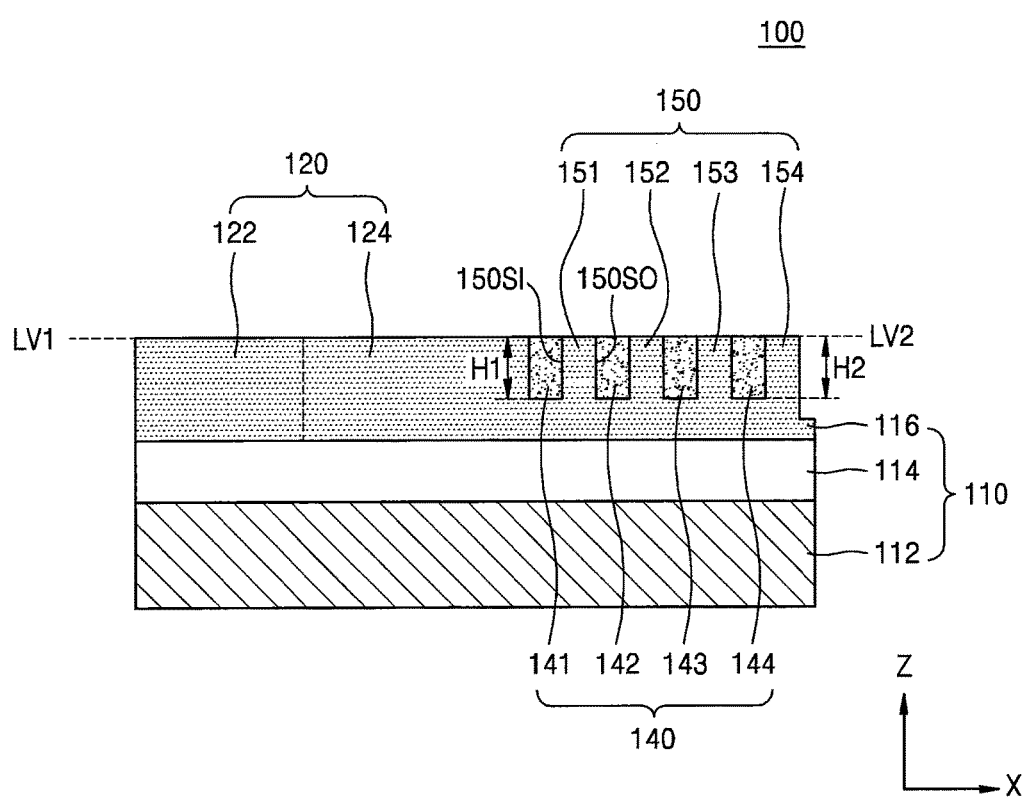
FIG. 3 is a cross-sectional view taken along a line of FIG. 1.

FIG. 1 is a perspective view of an optical apparatus 100 according to example embodiments. FIG. 2 is a plan view of the optical apparatus 100 shown in FIG. 1. FIG. 3 is a cross-sectional view taken along a line of FIG. 1. Some elements of the optical apparatus 100 are omitted in FIGS. 2 and 3.

Referring to FIGS. 1 to 3, the optical apparatus 100 may include an optical waveguide 120, a grating pattern 130, and an optical fiber 160.

The optical waveguide 120 may be located on a substrate 110 and extend in a first direction (e.g., X direction in FIG. 1) parallel to a top or upper surface of the substrate 110. The optical waveguide 120 may include a guiding portion 122 and a taper portion 124.

The substrate 110 may include a silicon substrate, a germanium substrate, or a compound semiconductor substrate, such as silicon carbide (SiC), a gallium arsenide (GaAs) substrate, an indium arsenide (InAs) substrate, and an indium phosphide (InP) substrate. Also, the substrate 110 may have a silicon-on-insulator (SOI) structure.

In example embodiments, the substrate 110 may be a SOI substrate. As shown in FIG. 1, the substrate 110 may include a base substrate 112, a buried oxide layer 114, and a semiconductor layer 116. The buried oxide layer 114 may be formed to a thickness of several tens of nanometers to several tens of micrometers, and the semiconductor layer 116 may be formed on the base substrate 112 to a predetermined thickness so that the buried oxide layer 114 may be interposed between the semiconductor layer 116 and the base substrate 112. The semiconductor layer 116 may be electrically isolated from the base substrate 112 by the buried oxide layer 114.

In other example embodiments, the substrate 110 may be a bulk silicon substrate. The substrate 110 may include the buried oxide layer 114 buried in a portion of the silicon substrate 112 and the semiconductor layer 116 located on the buried oxide layer 114. In this case, the optical waveguide 120 may be located on the semiconductor layer 116 and extend in a direction parallel to a top surface of the semiconductor layer 116.

The guiding portion 122 may be an optical channel to which an optical signal may be transmitted. The guiding portion 122 may transmit an optical signal, which is transmitted from inside of a circuit disposed on the substrate 110, or transmit an optical signal, which is incident from outside of the circuit.

In example embodiments, the guiding portion 122 may include a core layer and an upper cladding layer and a lower cladding layer located on and under the core layer, respectively. The core layer may have a sectional structure surrounded by the upper and lower cladding layers. Light waves may not be externally radiated but confined and travel based on the principle of total internal reflection. The upper and lower cladding layers may include a dielectric material having a relatively low refractive index, while the core layer may include a dielectric material having a relatively high refractive index. For example, the core layer may include silicon, and the upper and lower cladding layers may include silicon oxide ($SiO_2$) or air, but the inventive concept is not limited thereto.

In example embodiments, a portion of the buried oxide layer 114 located under the guiding portion 122 may function as a lower cladding layer, while an air layer located on the guiding portion 122 may function as an upper cladding layer. In other example embodiments, an upper insulating layer including silicon oxide and covering the guiding portion 122 may be formed and function as an upper cladding layer.

The taper portion 124 may extend in a first direction (e.g., X direction in FIG. 1) from one end of the guiding portion 122 on the substrate 110. The taper portion 124 may be a middle region configured to transmit an optical signal, which is transmitted from the guiding portion 122, through the grating pattern 130 to the optical fiber 160 or transmit an optical signal, which is transmitted from the optical fiber 160 to the grating pattern 130, into the guiding portion 122. In particular, the taper portion 124 may guide and focus light, which is transmitted from the grating pattern 130, and transmit the light to the guiding portion 122. Alternatively, the taper portion 124 may guide and transmit light, which is transmitted from the guiding portion 122, to the grating pattern 130.

The taper portion 124 may extend in the same direction as an extension direction of the guiding portion 122. A width of the taper portion 124 in a second direction (e.g., Y direction in FIG. 2) perpendicular to the extension direction of the guiding portion 122 may gradually increase or increase at a predetermined rate (e.g., at a constant rate). The taper portion 124 may include a sidewall 124S, which may be a curved sidewall having a curvature defined by a circular path. The sidewall 124S of the taper portion 124 may have or define a second focus position FP2 located in the taper portion 124. The second focus position FP2 may be at the radius of curvature of the curve defined by the sidewall 124S. Thus, back reflection, which may mainly occur on the sidewall 124S of the taper portion 124, may be reduced. A reduction of back reflection due to the sidewall 124S of the taper portion 124 will be described in greater detail below.

The grating pattern 130 may be located on one side of the taper portion 124 (e.g., on the opposite side of the taper portion 124 as the guiding portion 122). The grating pattern 130 may be an optical coupling region configured to receive light from the optical fiber 160 located on the grating pattern 130 and transmit the received light into the optical waveguide 120.

The grating pattern 130 may include a plurality of low refractive index portions 140 and a plurality of high refractive index portions 150, which may be alternately arranged in a first direction (or X direction in FIG. 1). The plurality of low refractive index portions 140 may include a first low refractive index portion 141, a second low refractive index portion 142, a third low refractive index portion 143, and a fourth low refractive index portion 144, which may be sequentially arranged from a position adjacent the taper portion 124. The plurality of high refractive index portions 150 may include a first high refractive index portion 151, a second high refractive index portion 152, a third high refractive index portion 153, and a fourth high refractive index portion 154, which may be sequentially arranged from a position adjacent the taper portion 124. For example, the first low refractive index portion 141 may be located on one side of the taper portion 124, and a first high refractive index portion 151 may be located on one side of the first low refractive index portion 141 such that the first low refractive index portion 141 is located between the taper portion 124 and the first high refractive index portion 151. Also, the second low refractive index portion 142 may be located on one side of the first high refractive index portion 151 such that the first high refractive index portion 151 is located between the first low refractive index portion 141 and the second low refractive index portion 142.

In the interest of brevity, FIGS. 1 to 3 illustrate an example in which the plurality of low refractive index portions 140 include the first to fourth low refractive index portions 141, 142, 143, and 144 and the plurality of high refractive index portions 150 include the first to fourth high refractive index portions 151, 152, 153, and 154, but the number of low refractive index portions 140 and the number of high refractive index portions 150 are not limited thereto. For example, the number of low refractive index portions 140 and the number of high refractive index portions 150 may vary according to the size of the optical fiber 160, the size of the taper portion 124, the wavelength of an optical signal, the linewidth of the optical signal, and a required optical coupling efficiency value.

The plurality of low refractive index portions 140 may have a first refractive index, and the plurality of high refractive index portions 150 may have a second refractive index higher than the first refractive index. In example embodiments, the plurality of high refractive index portions 150 may include silicon, and the plurality of low refractive index portions 14Q may include silicon oxide (SiOx). For example, silicon may have a refractive index of about 3.4434, and silicon dioxide (SiO$_2$) may have a refractive index of about 1.4310. However, materials and refractive indices of the plurality of low refractive index portions 140 and the plurality of high refractive index portions 150 are not limited thereto.

The low refractive index portions 140 and the high refractive index portions 150 included in the grating pattern 130 may be arranged in the first direction and have a predetermined first period P1 and a first width W1. Here, a width of one of the plurality of high refractive index portions 150 in the first direction may be referred to as the first width W1 of the grating pattern 130. Also, the sum of a width of one of the plurality of low refractive index portions 140 in the first direction and a width of one high refractive index portion 151, which is adjacent to the low refractive index portion 140 among the high refractive index portions 150, in the first direction may be referred to as the first period P1 of the grating pattern 130. In example embodiments, the first period P1 of the grating pattern 130 may range from about 20 nm to about 500 nm, and the first width W1 of the grating pattern 130 may range from about 10 nm to about 300 nm. However, the first period P1 and the first width W1 of the grating pattern 130 are not limited thereto but may vary according to a width w and wave vector (k-vector) of incident light.

Materials or refractive indices of the plurality of low refractive index portions 140 and the plurality of high refractive index portions 150 and the first period P1 and first width W1 of the grating pattern 130 may be controlled to increase optical coupling efficiency of an optical signal transmitted from the optical fiber 160 into the optical waveguide 120 (that is, a ratio of the quantity or intensity of an optical signal confined in the guiding portion 122 to the total quantity or intensity of an optical signal received from the optical fiber 160). Hereinafter, principles of optical coupling that occur in the grating pattern 130 will be schematically described with reference to FIG. 4.

Figure 4:
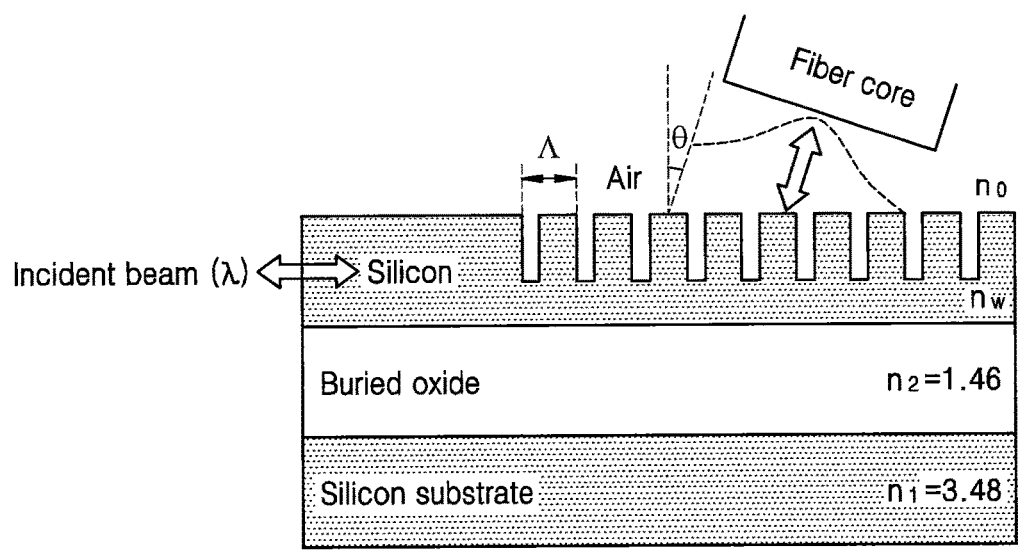
FIG. 4 is a schematic view showing optical coupling principles using a grating pattern.

FIG. 4 is a schematic diagram showing optical coupling principles using the grating pattern 130.

Referring to FIG. 4, a phase of incident beams may need to match with a phase of a grating coupler so that the incident beams may be optically coupled with the grating coupler at high optical coupling efficiency. Phase matching conditions may be expressed as in Equation 1:

$$-\frac{n_o}{\lambda}\sin\theta + \frac{n_w}{\lambda} = \frac{1}{\Lambda}, \tag{1}$$

wherein λ may be a central wavelength of incident beams, Λ may be a period of the grating pattern 130, $n_0$ may be a refractive index of a material (e.g., air) surrounding silicon, and $n_w$ may be an effective refractive index of the grating pattern 130. The effective refractive index $n_w$ of the grating pattern 130 may vary according to the width of the plurality of low refractive index portions 140 and the width of the plurality of high refractive index portions 150. For example, the effective refractive index $n_w$ may vary according to a ratio of silicon to air (e.g., a volume ratio of silicon to air or a width ratio of silicon to air) in the grating pattern 130. The effective refractive index $n_w$ may range between $n_0$ and a refractive index (n=3.48) of silicon.

Referring back to FIG. 2, each of the plurality of high refractive index portions 150 may include an inner sidewall 150SI and an outer sidewall 150SO. Here, among two sidewalls of each of the plurality of high refractive index portions 150, a sidewall that is closer to the taper portion 124 may be referred to as the inner sidewall 150SI, and a sidewall that is further from the taper portion 124 may be referred to as the outer sidewall 150SO. The inner sidewall 150SI and the outer sidewall 150SO of each of the plurality of high refractive index portions 150 may be curved sidewalls having curvatures defined by circular paths. Accordingly, light reflected or diffracted by the inner sidewall 150SI and the outer sidewall 150SO may be focused on one point, which may be referred to as a first focus position FP1. The first focus position FP1 may be at the radius of curvature of the curves defined by the inner sidewall 150SI and the outer sidewall 150SO. The inner sidewall 150SI and the outer sidewall 150SO of each of the plurality of high refractive index portions 150 may have or define the same first focus position FP1. That is, the inner sidewall 150SI and the outer sidewall 150SO of each of the plurality of high refractive index portions 150 may be portions of outer circumferences of a plurality of concentric circles having the first focus position FP1 as the center of the circles.

In example embodiments, the first focus position FP1 may be located at an interface between the guiding portion 122 and the taper portion 124. Also, the first focus position FP1 may be located on an extension line CL of a central line or centerline of the guiding portion 122, which may extend along an extension line or longitudinal axis or line of the guiding portion 122. As described above, light reflected or diffracted on the inner sidewall 150SI and the outer sidewall 150SO of each of the plurality of high refractive index portions 150 may be focused on the first focus position FP1, and the first focus position FP1 may be located on the interface between the guiding portion 122 and the taper portion 124 on the extension line CL of the central line of the guiding portion 122. Thus, optical coupling efficiency of the grating pattern 130 may increase.

The inner sidewall 150SI and the outer sidewall 150SO of each of the plurality of high refractive index portions 150 may have or define the first focus position FP1, while the sidewall 124S of the taper portion 124 may have or define the second focus position FP2 different from or spaced apart from the first focus position FP1. The second focus position FP2 may be located in the taper portion 124 on the extension line CL of the central line of the guiding portion 122. That is, among optical signals received from the optical fiber 160, an optical signal transmitted to the sidewall 124S of the taper portion 124 may not be focused on an interface between the guiding portion 122 and the taper portion 124 but focused on an inner point of the taper portion 124. Thus, although optical coupling efficiency is reduced to some extent, occurrence of back reflection at an interface between the optical waveguide 120 and the grating pattern 130 due to a sharp index contrast may be considerably reduced.

Specifically, each of the sidewall 124S of the taper portion 124 and the inner sidewall 150SI and the outer sidewall 150SO of each of the plurality of high refractive index portions 150 may have the first focus position FP1. If the first focus position FP1 is located on an end tip of the guiding portion 122 or an exit surface of the guiding portion 122, back reflection may occur due to a large index contrast between the taper portion 124 and the plurality of low refractive index portions 140 or a relatively large index contrast between the guiding portion 122 and the outside (i.e., air). In particular, when an optical signal generated by a light source, such as a single-mode laser source, is transmitted from the optical waveguide 120, back reflection may be apt to occur in the single-mode laser source due to a large index contrast between the taper portion 124 and the grating pattern 130. When the sidewall 124S of the taper portion 124 has the first focus position FP1, light reflected by an interface between the sidewall 124S of the taper portion 124 and the grating pattern 130 may be focused on the first focus position FP1, that is, the end tip of the guiding portion 122. Thus, the reflected light may be transmitted in an opposite direction to a direction in which the reflected light is transmitted (e.g., initially transmitted). If a large quantity of light is back-reflected, damage may occur to a light source, for example, a semiconductor diode laser source. In particular, output power or lifespan of the light source may be reduced due to the large quantity of back-reflected light. Accordingly, as the quantity of light back-reflected toward the inside of the guiding portion 122 increases, stability of the light source may be reduced.

However, as shown in FIG. 1, since the sidewall 124S of the taper portion 124 has the second focus position FP2 and the second focus position FP2 is located in the taper portion 124, light reflected at the interface between the sidewall 124S of the taper portion 124 and the grating pattern 130 may be focused on the inside of the taper portion 124. Accordingly, the quantity of light back-reflected toward the inside of the guiding portion 122 may be markedly reduced. The above-described effect was confirmed via simulation results obtained by measuring optical coupling efficiency and back reflection relative to a first distance D1 between the first focus position FP1 and the second focus position FP2. The simulation results will be described below with reference to FIG. 13.

Hereinafter, the relative arrangement of the first and second focus positions FP1 and FP2 in the taper portion 124 will be described with reference to FIG. 5.

Figure 5:
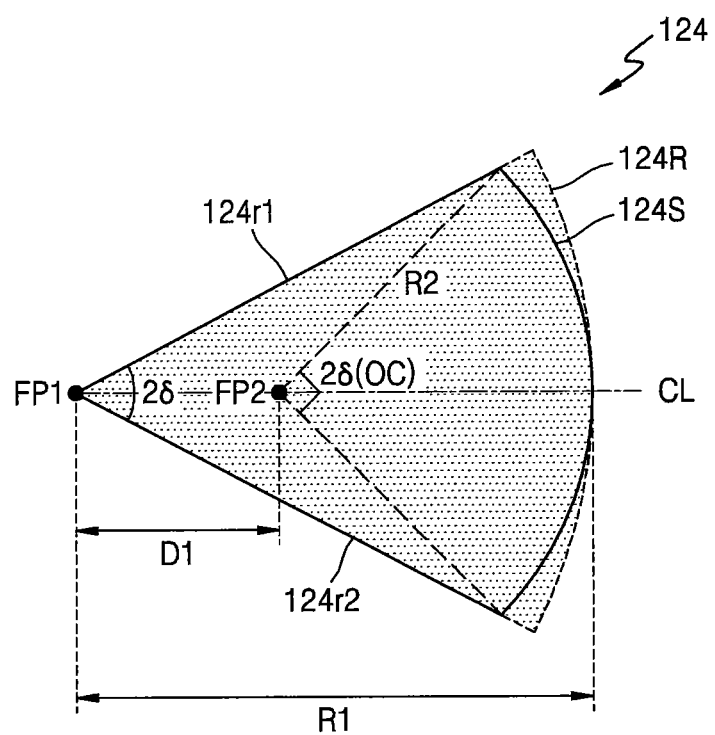
FIG. 5 is a schematic diagram of relative arrangements of first and second focus positions in a taper portion.

Referring to FIGS. 2 and 5, both the first focus position FP1 and the second focus position FP2 may be located on the extension line CL of the central line of the guiding portion 122. The first focus position FP1 and the second focus position FP2 may be spaced apart the first distance D1 in an extension direction (i.e., the first direction) of the guiding portion 122. The taper portion 124 may have a first length R1 in the first direction and have a fan shape having a central angle of about 2δ. In FIG. 5, when a sidewall of the taper portion 124 is a portion of an outer circumference of a circle having the first focus position FP1 as a center, the sidewall of the taper portion 124 may be referred to as a reference sidewall 124R, and an outline or projection of the reference sidewall 124R is illustrated with a dotted line. The reference sidewall 124R may correspond to an arc of a sector having radii 124r1 and 124r2 of the first length R1 and a central angle of about 2δ.

The sidewall 124S of the taper portion 124 may be a portion of an outer circumference of a circle having the second focus position FP2 located in the taper portion 124 at a center of the circle. The sidewall 124S may correspond to an arc of a sector having a radius of a second length R2 less than the first length R1 and a central angle of 2δ(OC) larger than 2δ. The sidewall 124S may have a radius of curvature of the second length R2, which is less than the first length R1 that is the radius of curvature of the reference sidewall 124R. Accordingly, a sector defined by the two radii 124r1 and 124r2 and the sidewall 124S may have a smaller area than an area of a sector defined by the two radii 124r1 and 124r2 and the reference sidewall 124R. That is, as the radius of curvature of the sidewall 124S of the taper portion 124 decreases, the area of the taper portion 124 may be reduced. Since optical coupling efficiency is reduced with a reduction in the area of the taper portion 124, the central angle 2δ(OC) of the sector defined by the sidewall 124S may not exceed an angle of about 90° so as to not overly lower optical coupling efficiency.

FIG. 5 illustrates a schematic layout of the taper portion 124 when a sector defined by the sidewall 124S has a central angle 2δ(OC) of about 90°. Here, the first distance D1 between the first focus position FP1 and the second focus position FP2 may be a difference between the first length R1 and the second length R2 as expressed in Equation 2:

$$D1 = R1 - R2 \qquad (2).$$

Equation 3 is established to satisfy a condition where a central angle 2δ(OC) of a sector defined by the sidewall 124S is 90°.

$$(R1 - R2 + R2/\sqrt{2})\tan\delta = R2/\sqrt{2} \qquad (3).$$

By calculating a ratio of the second length R2 to the first length R1 from Equation 3, Equation 4 may be obtained.

$$R2 = \frac{\sqrt{2}\tan\delta}{\tan\delta(\sqrt{2}-1)+1} R1. \qquad (4)$$

That is, a ratio R2/R1 of the second length R2 to the first length R1 may vary according to the central angle 2δ of the sector defined by the reference sidewall 124R.

Table 1 shows a ratio (i.e., R2/R1) of the second length R2 to the first length R1 and a ratio (i.e., D1/R1) of the first distance D1 to the first length R1 relative to the central angle 2δ of the taper portion 124.

TABLE 1

| 2δ (degree) | R2/R1 | D1/R1 |
|---|---|---|
| 90° | 1 | 0 |
| 60° | 0.658 | 0.442 |
| 45° | 0.5 | 0.5 |
| 40° | 0.447 | 0.553 |
| 30° | 0.341 | 0.659 |
| 20° | 0.232 | 0.768 |
| 10° | 0.119 | 0.881 |

In example embodiments, the central angle 2δ of the taper portion 124 may vary in consideration of the size of the optical fiber 160, the size of the taper portion 124, a light central wavelength, a light linewidth, and a required optical coupling efficiency value. For example, the central angle 2δ of the taper portion 124 may range from about 10° to about 60°, but is not limited thereto. Also, the first distance D1 between the first focus position FP1 and the second focus position FP2 may be less than about 90% of the first length R1. For example, the first distance D1 between the first focus position FP1 and the second focus position FP2 may be less than about 80% of the first length R1. As described above, when the first distance D1 between the first focus position FP1 and the second focus position FP2 is excessively large, a radius of curvature of the sidewall 124S of the taper portion 124 may be reduced. Thus, an area of the taper portion 124 may be reduced, thereby lowering optical coupling efficiency.

Referring back to FIG. 3, the sidewall 124S of the taper portion 124 may have a first height H1 in a third direction (e.g., Z direction in FIG. 3) perpendicular to a top surface of the substrate 110. The inner sidewall 150SI or the outer sidewall 150SO of each of the plurality of high refractive index portions 150 may have a second height H2 in the third direction. In example embodiments, the second height H2 may be substantially equal or similar to the first height H1. In other words, a top surface LV2 of the plurality of high refractive index portions 150 may be substantially at the same level or substantially in the same plane as a top level LV1 of the taper portion 124. The top surface LV2 may be substantially at the same level as the top level LV1 because, in a process of forming the optical apparatus 100 according to an example embodiment, the sidewall 124S of the taper portion 124 and the inner sidewall 150SI and the outer sidewall 150SO of the plurality of high refractive index portions 150 are simultaneously formed when using an etch mask to etch the semiconductor layer 116 having a predetermined height. Specifically, since the sidewall 124S of the taper portion 124 has or defines the second focus position FP2 located in the taper portion 124, back reflection of light to be transmitted may be remarkably reduced. Accordingly, by not forming a top level of the grating pattern 130 to be higher than the top level LV1 of the taper portion 124, it may be unnecessary to perform a plurality of etching processes or a process of re-growing the grating pattern 130 after the etching processes to prevent back reflection.

In the optical apparatus 100, the second focus position FP2 of the sidewall 124S of the taper portion 124 may be differently positioned from the first focus position FP1 of the plurality of high refractive index portions 150. Thus, optical coupling efficiency may be slightly reduced, while back reflection of light to be transmitted may be markedly reduced. Therefore, stability of the optical apparatus 100 may be enhanced.

Figure 6:
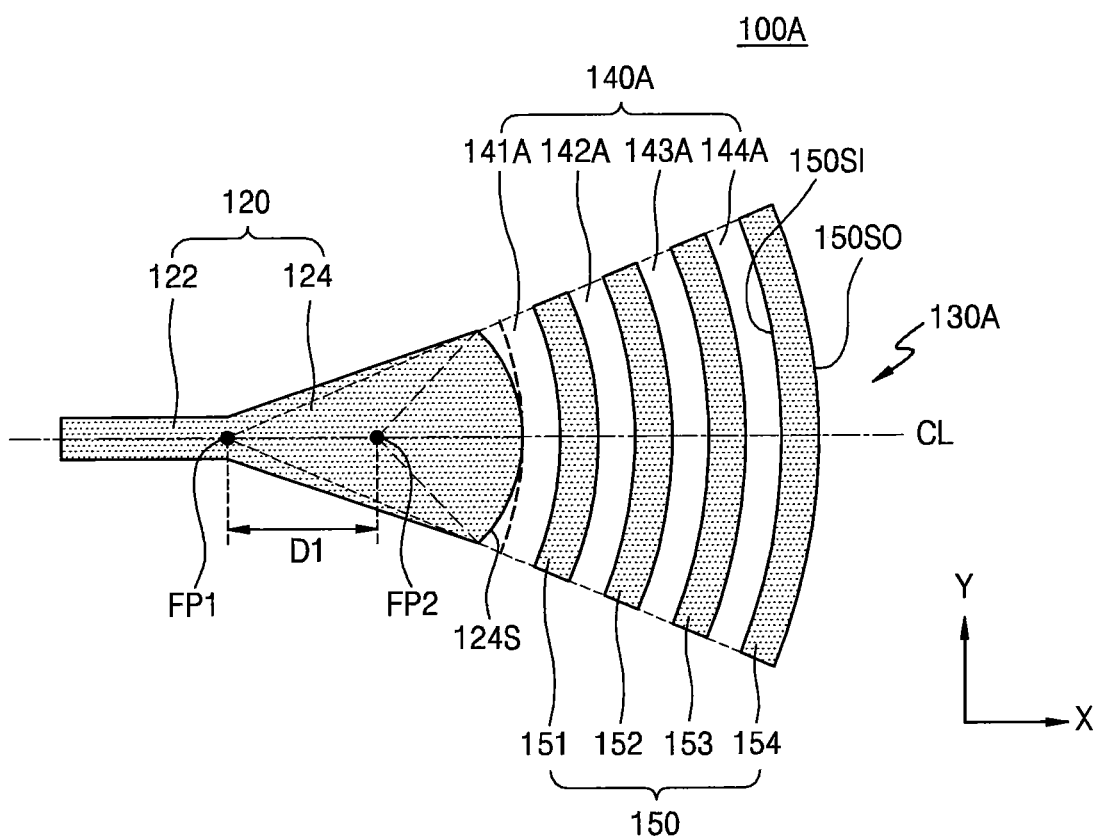
FIG. 6 is a plan view of an optical apparatus according to example embodiments.
Figure 7:
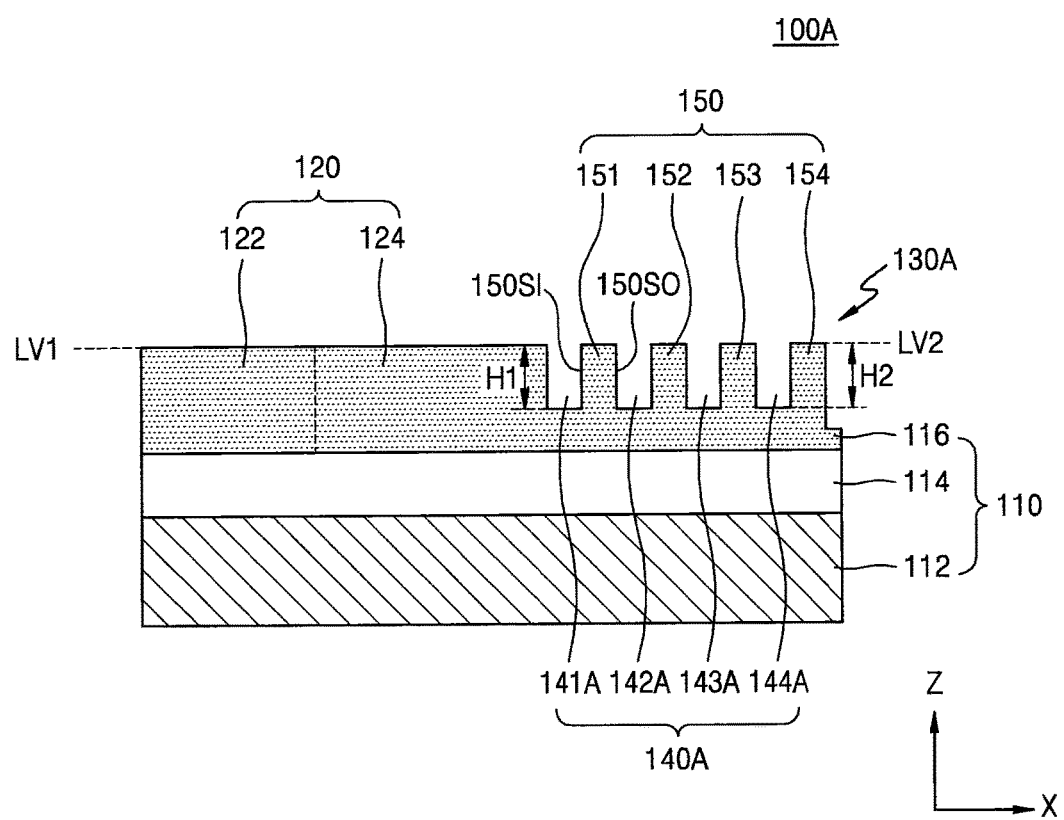
FIG. 7 is a cross-sectional view of the optical apparatus shown in FIG. 6.

FIG. 6 is a plan view of an optical apparatus 100A according to example embodiments, and FIG. 7 is a cross-sectional view of the optical apparatus 100A shown in FIG. 6. FIG. 7 is equivalent to a cross-sectional taken along a line III-III' of FIG. 1. In FIGS. 6 and 7, the same reference numerals are used to denote the same elements as in FIGS. 1 to 3 and thus, detailed descriptions thereof may be omitted in the interest of brevity. Since the optical apparatus 100A described with reference to FIGS. 6 and 7 is similar to the optical apparatus 100 described with reference to FIGS. 1 to 3 except for a plurality of low refractive index portions 140A, differences between the optical apparatus 100A and the optical apparatus 100 will primarily be described below.

Referring to FIGS. 6 and 7, the optical apparatus 100A may include a plurality of low refractive index portions 140A and a plurality of high refractive index portions 150, which may be alternately arranged on one side of a taper portion 124 in a first direction.

In example embodiments, the plurality of high refractive index portions 150 may include silicon, and the plurality of low refractive index portions 140A may include air. Air may have a refractive index of 1.000293. For example, since silicon has a refractive index of about 3.4434 and air has a refractive index of about 1.000293, an index contrast between silicon and the air may be comparatively high. Accordingly, a grating pattern 130A including the plurality of low refractive index portions 140A and the plurality of high refractive index portions 150 may be a grating pattern having a relatively high index contrast. The grating pattern 130A may be referred to as a high-index contrast grating (HCG).

In a process of forming the optical apparatus 100A according to an example embodiment, the taper portion 124 and the plurality of high refractive index portions 150 may be formed by etching a semiconductor layer 116 having a predetermined height using an etch mask. Portions of the semiconductor layer 116, which may remain after the etching process, may be the taper portion 124 and the plurality of high refractive index portions 150. Also, portions of the semiconductor layer 116, which are removed due to the etching process, may be the plurality of low refractive index portions 140A. Specifically, each of the plurality of low refractive index portions 140A may be defined as a space between an inner sidewall 150SI of one of the plurality of high refractive index portions 150 and an outer sidewall 150SO of a high refractive index portion 150, which is opposite and adjacent the inner sidewall 150SI. Also, one of the plurality of low refractive index portions 140A, which is closest to the taper portion 124, may be defined as a space between the sidewall 124S of the taper portion 124 and the inner sidewall 150SI of the first high refractive index portion 151.

In the optical apparatus 100A, since the plurality of low refractive index portions 140A include air, an index contrast between the plurality of low refractive index portions 140A and the plurality of high refractive index portions 150 may be further increased. Thus, the optical apparatus 100A may have enhanced optical coupling efficiency. Furthermore, a position of the second focus position FP2 of the sidewall 124S of the taper portion 124 may be different from the first focus position FP1 of the plurality of high refractive index portions 150. Thus, optical coupling efficiency may be slightly reduced, while back reflection of light to be transmitted may be markedly reduced. Therefore, stability of the optical apparatus 100A may be enhanced.

Figure 8:
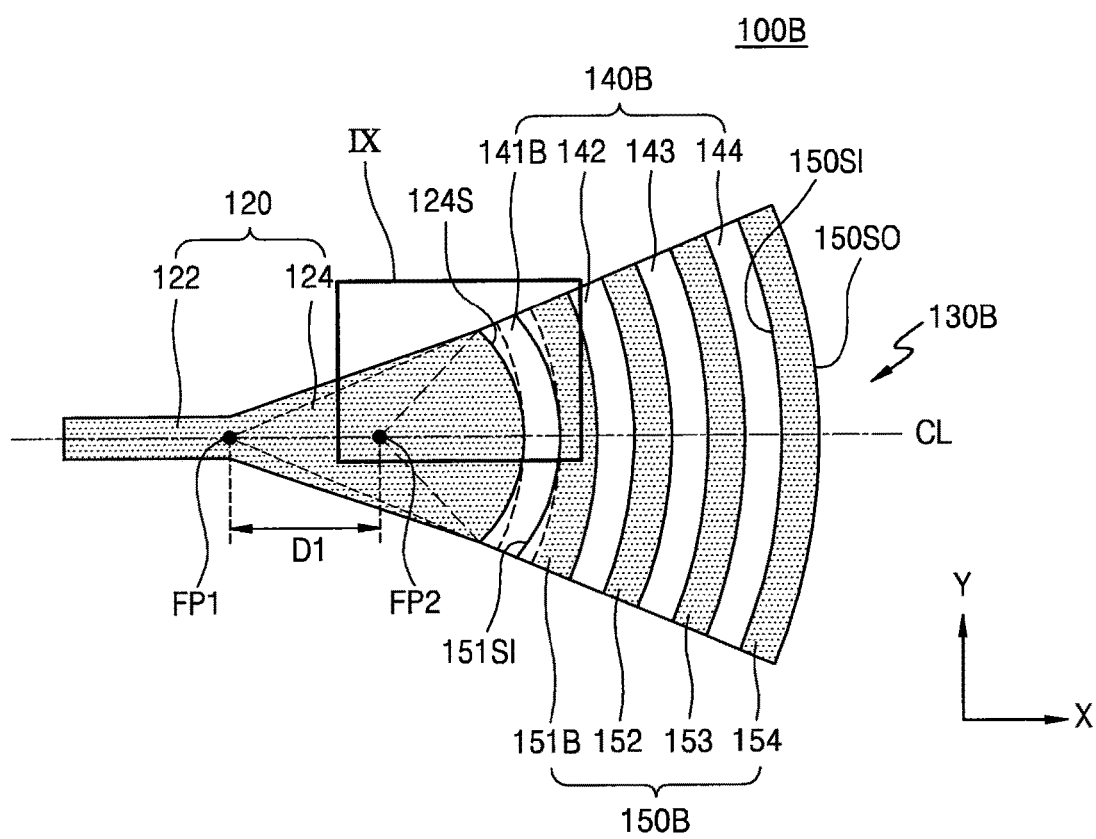
FIG. 8 is a plan view of an optical apparatus according to example embodiments.
Figure 9:
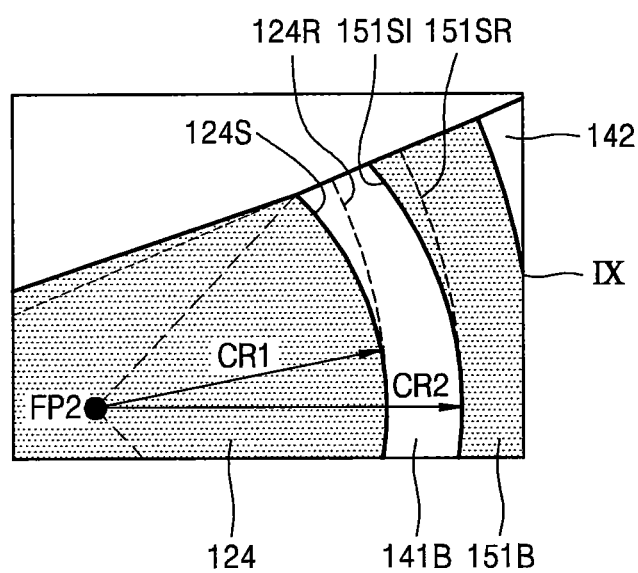
FIG. 9 is an enlarged view of a portion IX of FIG. 8.

FIG. 8 is a plan view of an optical apparatus 100B according to example embodiments, and FIG. 9 is an enlarged view of a portion IX of FIG. 8. In FIGS. 8 and 9, the same reference numerals are used to denote the same elements as in FIGS. 1 to 7 and thus, detailed descriptions thereof may be omitted in the interest of brevity.

Referring to FIGS. 8 and 9, a grating pattern 130B may include a plurality of low refractive index portions 140B and a plurality of high refractive index portions 150B. An inner sidewall 150SI and an outer sidewall 150SO of each of the plurality of high refractive index portions 150B may have or define a first focus position FP1, and a sidewall 124S of a taper portion 124 may have or define a second focus position FP2 different from the first focus position FP1. An inner sidewall 150SI of one of the plurality of high refractive index portions 150B that is closest to the taper portion 124 may have or define the second focus position FP2 that is different from the first focus position FP1. The second focus position FP2 may be located on an extension line CL of a central line of the guiding portion 122 in a first direction (refer to the X direction in FIG. 8) and located in the taper portion 124.

In example embodiments, among the plurality of high refractive index portions 150B, an inner sidewall 151SI of a first high refractive index portion 151B may be a portion of an outer circumference of a circle having the second focus position FP2 as a center. The inner sidewall 151SI of the first high refractive index portion 151B may have a radius CR2 of curvature less than a radius (refer to R1 in FIG. 5) of curvature of each of sidewalls 150SI and 150SO of the remaining high refractive index portions 150B. In FIG. 9, when the inner sidewall 151SI of the first high refractive index portion 151B is a portion of an outer circumference of a circle having the first focus position FP1 as a center, the inner sidewall 151SI of the first high refractive index portion 151B may be referred to as or used to define a reference inner sidewall 151SR, and an outline or projection of the reference inner sidewall 151SR is illustrated with a dotted line. The inner sidewall 151SI of the first high refractive index portion 151B may be located more adjacent to the taper portion 124 than the reference inner sidewall 151SR.

Meanwhile, the sidewall 124S of the taper portion 124 may be a portion of an outer circumference of a circle having the second focus position FP2 as a center. In this case, a radius CR1 of curvature of the sidewall 124S of the taper portion 124 may be less than the radius CR2 of curvature of the inner sidewall 151SI of the first high refractive index portion 151B. The sidewall 124S of the taper portion 124 and the inner sidewall 151SI of the first high refractive index portion 151B may be portions of outer circumferences of circles having the same center (e.g., concentric circles).

In the optical apparatus 100B, the sidewall 124S of the taper portion 124 may have the second focus position FP2, and the inner sidewall 151SI of the first high refractive index portion 151B closest to the taper portion 124 among the plurality of high refractive index portions 150B, may have the second focus position FP2. The second focus position FP2 may be different from the first focus position FP1 of the sidewalls 150SI and 150SO of the remaining high refractive index portions 150. Thus, optical coupling efficiency may be slightly reduced, while back reflection of light to be transmitted may be markedly reduced. Accordingly, stability of the optical apparatus 100B may be enhanced.

Meanwhile, FIG. 8 illustrates a case in which the sidewall 124S of the taper portion 124 and the inner sidewall 151SI of the first high refractive index portion 151B, which is closest to the taper portion 124 among the plurality of high refractive index portions 150B, have the second focus position FP2, but the inventive concept is not limited thereto. Unlike as shown in FIG. 8, an outer sidewall 150SO of the first high refractive index portion 151B, which is closest to the taper portion 124 among the plurality of high refractive index portions 150B, may have the second focus position FP2. In another case, an inner sidewall 150SI or outer sidewall 150SO of a second high refractive index portion 152 that is second closest to the taper portion 124 may have the second focus position FP2.

FIG. 8 illustrates an example in which only one inner sidewall 151SI of the sidewalls 150SI and 150SO of the plurality of high refractive index portions 150B has the second focus position FP2, but the inventive concept is not limited thereto. Unlike as shown in FIG. 8, at least one inner sidewall 150SI and at least one outer sidewall 150SO of the sidewalls 150SI and 150SO of the plurality of high refractive index portions 150B may have the second focus position FP2. In another case, at least two inner sidewalls 150SI or at least two outer sidewalls 150SI of the sidewalls 150SI and 150SO of the plurality of high refractive index portions 150B may have the second focus position FP2.

Figure 10:
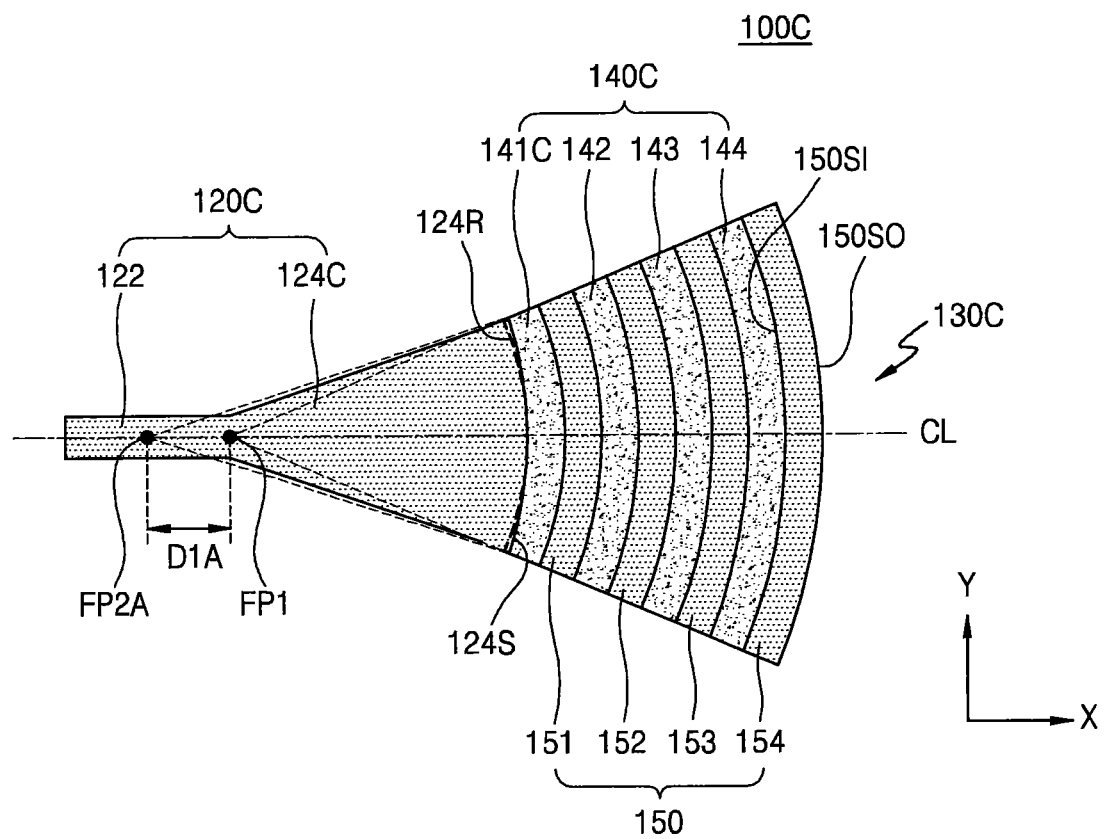
FIG. 10 is a plan view of an optical apparatus according to example embodiments.

FIG. 10 is a plan view of an optical apparatus 100C according to example embodiments. In FIG. 10, the same reference numerals are used to denote the same elements as in FIGS. 1 to 9 and thus, detailed descriptions thereof may be omitted in the interest of brevity.

Referring to FIG. 10, a grating pattern 130C may include a plurality of low refractive index portions 140C and a plurality of high refractive index portions 150C. An optical waveguide 120C may include a taper portion 124C, and a sidewall 124S of the taper portion 124C may have or define a second focus position FP2A. The second focus position FP2A may be located in a guiding portion 122. Also, the second focus position FP2A may be located on an extension line CL of a central line of the guiding portion 122 in the first direction, but the inventive concept is not limited thereto.

In example embodiments, the second focus position FP2A may be spaced a first distance D1A apart from a first focus position FP1 located at an interface between the guiding portion 122 and the taper portion 124C. Accordingly, the sidewall 124S of the taper portion 124C may be a portion of an outer circumference of a circle having the second focus position FP2A as a center, and a radius of curvature of the sidewall 124S of the taper portion 124C may be the sum of a length (refer to R1 in FIG. 5) of the taper portion 124C in the first direction and the first distance D1A. The radius of curvature of the sidewall 124S of the taper portion 124C may be greater than a radius (i.e., R1) of curvature of the reference sidewall 124R, and the sidewall 124S of the taper portion 124C may be located farther from the guiding portion 122 than the reference sidewall 124R. Accordingly, the taper portion 124C may have a relatively large area.

In the optical apparatus 100C, the sidewall 124S of the taper portion 124O may have the second focus position FP2A, and the second focus position FP2A may be located in the guiding portion 122. Thus, optical coupling efficiency may be slightly reduced, while back reflection of light to be transmitted may be markedly reduced. Accordingly, stability of the optical apparatus 100C may be improved.

Figure 11:
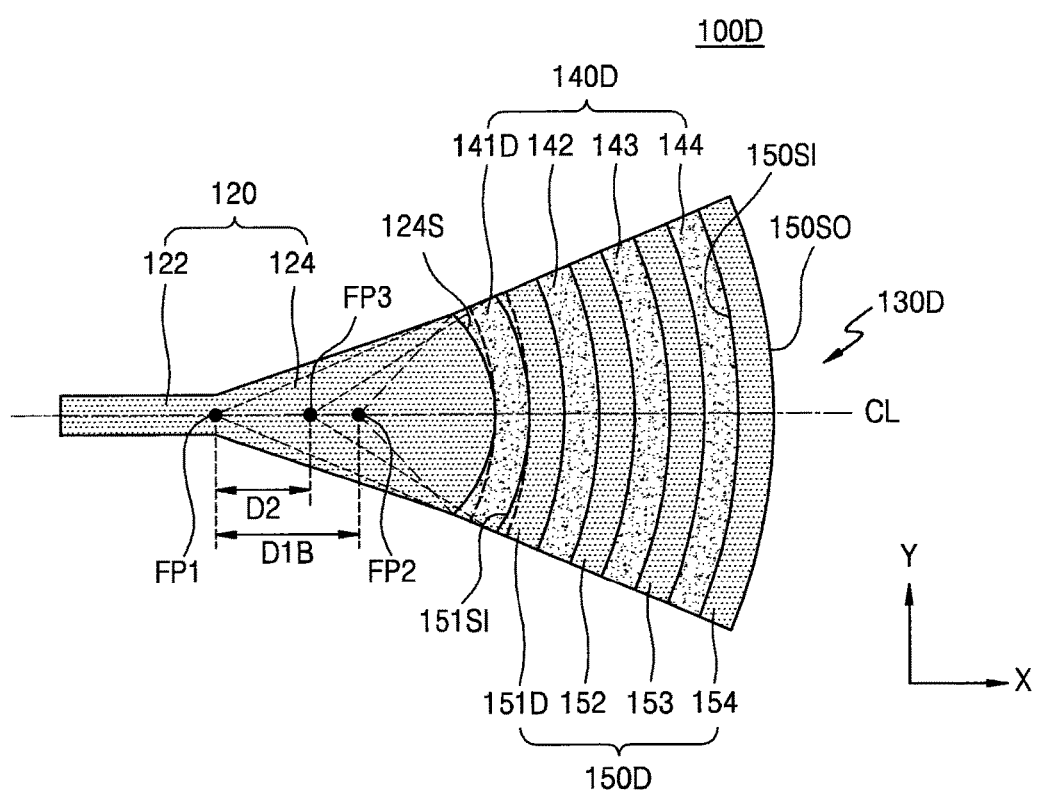
FIG. 11 is a plan view of an optical apparatus according to example embodiments.

FIG. 11 is a plan view of an optical apparatus 100D according to example embodiments. In FIG. 11, the same reference numerals are used to denote the same elements as in FIGS. 1 to 10 and thus, detailed descriptions thereof may be omitted in the interest of brevity.

Referring to FIG. 11, a sidewall 124S of a taper portion 124 may have or define a second focus position FP2, and an inner sidewall 151SI of a high refractive index portion 151D, which is closest to the taper portion 124 among a plurality of high refractive index portions 150D, may have or define a third focus position FP3 that is different from the second focus position FP2. The second and third focus positions FP2 and FP3 may be different from a first focus position FP1. In example embodiments, the first focus position FP1 may be located at an interface between a guiding portion 122 and the taper portion 124, and the second and third focus positions FP2 and FP3 may be located in the taper portion 124.

In example embodiments, the second focus position FP2 may be located a first distance D1B apart from the first focus position FP1, and the third focus position FP3 may be located a second distance D2 apart from the first focus position FP1. FIG. 11 illustrates an example in which the second distance D2 is smaller than the first distance D1B. However, the inventive concept is not limited thereto. Unlike as shown in FIG. 11, the second distance D2 may be greater than the first distance D1B.

In example embodiments, the second distance D2 may be less than 80% of a length (refer to R1 in FIG. 5) of the taper portion 124 in a first direction. Similarly, the first distance D1B may be less than 80% of the length R1 of the taper portion 124 in the first direction.

Figure 12:
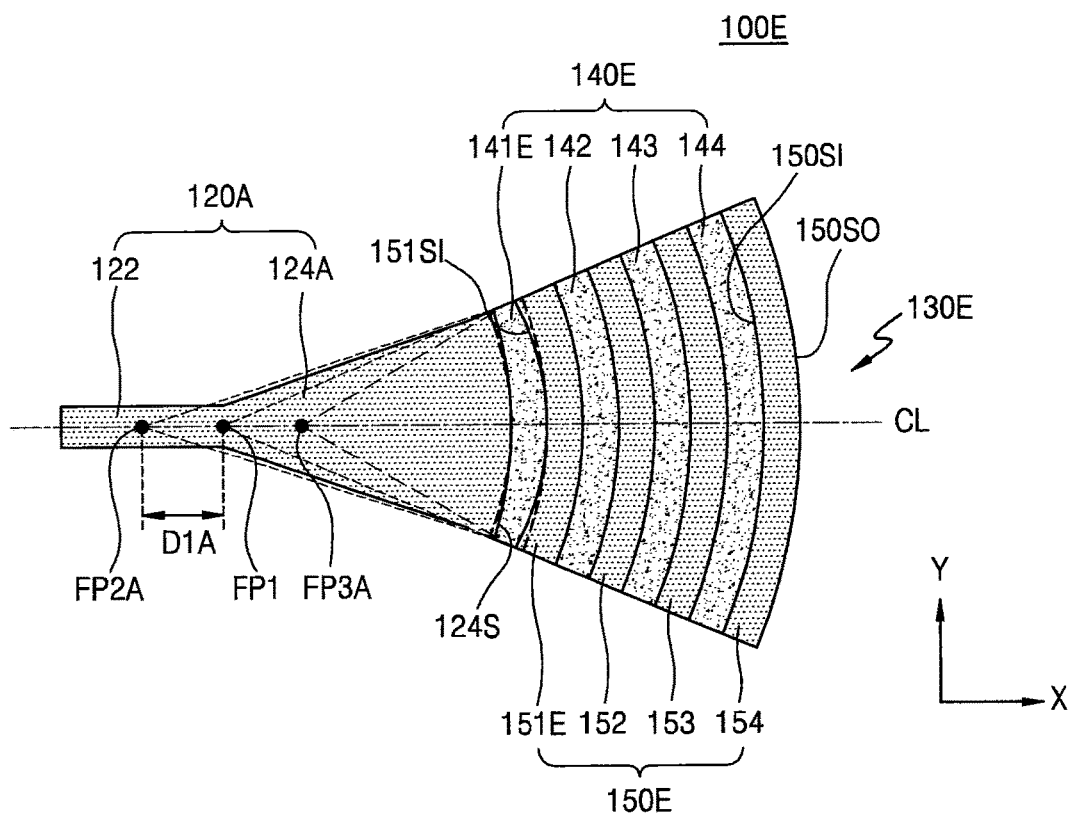
FIG. 12 is a plan view of an optical apparatus according to example embodiments.

FIG. 12 is a plan view of an optical apparatus 100E according to example embodiments. In FIG. 12, the same reference numerals are used to denote the same elements as in FIGS. 1 to 11 and thus, detailed descriptions thereof may be omitted in the interest of brevity.

Referring to FIG. 12, a sidewall 124S of a taper portion 124A may have or define a second focus position FP2A, and an inner sidewall 151SI of one of a plurality of high refractive index portions 150E, which is closest to the taper portion 124, may have or define a third focus position FP3A that is different from the second focus position FP2A. The second and third focus positions FP2A and FP3A may be different from the first focus position FP1. In example embodiments, the first focus position FP1 may be located at an interface between a guiding portion 122 and the taper portion 124, the second focus position FP2A may be located in the guiding portion 122, and the third focus position FP3A may be located in the taper portion 124A. However, in another case, the second focus position FP2A may be located in the taper portion 124A, and the third focus position FP3A may be located in the guiding portion 122.

Figure 13:
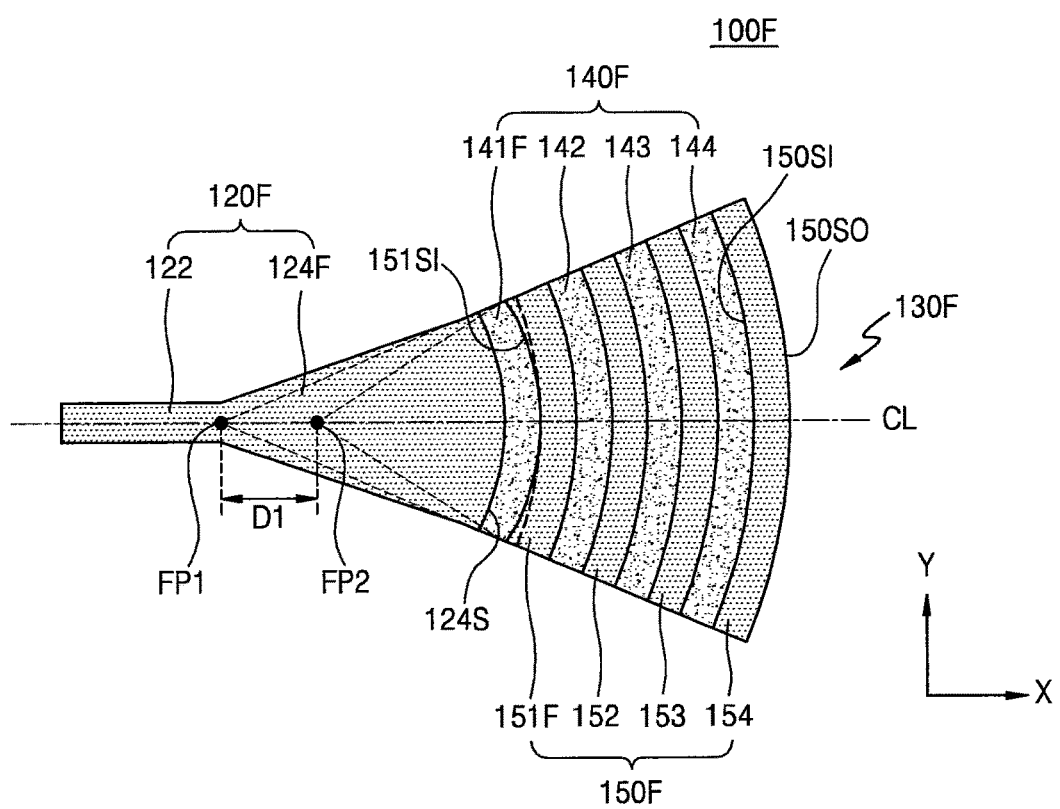
FIG. 13 is a plan view of an optical apparatus according to example embodiments.

FIG. 13 is a plan view of an optical apparatus 100F according to example embodiments. In FIG. 13, the same reference numerals are used to denote the same elements as in FIGS. 1 to 11 and thus, detailed descriptions thereof may be omitted in the interest of brevity.

Referring to FIG. 13, a sidewall 124S of a taper portion 124F may have or define a first focus position FP1, and an inner sidewall 151SI of a high refractive index portion 151F, which is closest to the taper portion 124F among a plurality of high refractive index portions 150F, may have or define a second focus position FP2. Among the plurality of high refractive index portions 150F, sidewalls 150SI and 150SO of the remaining high refractive index portions 150F may have or define a first focus position FP1. The first focus position FP1 may be located at an interface between a guiding portion 122 and the taper portion 124F and located on a central line of the guiding portion 122 in a first direction.

Figure 14:
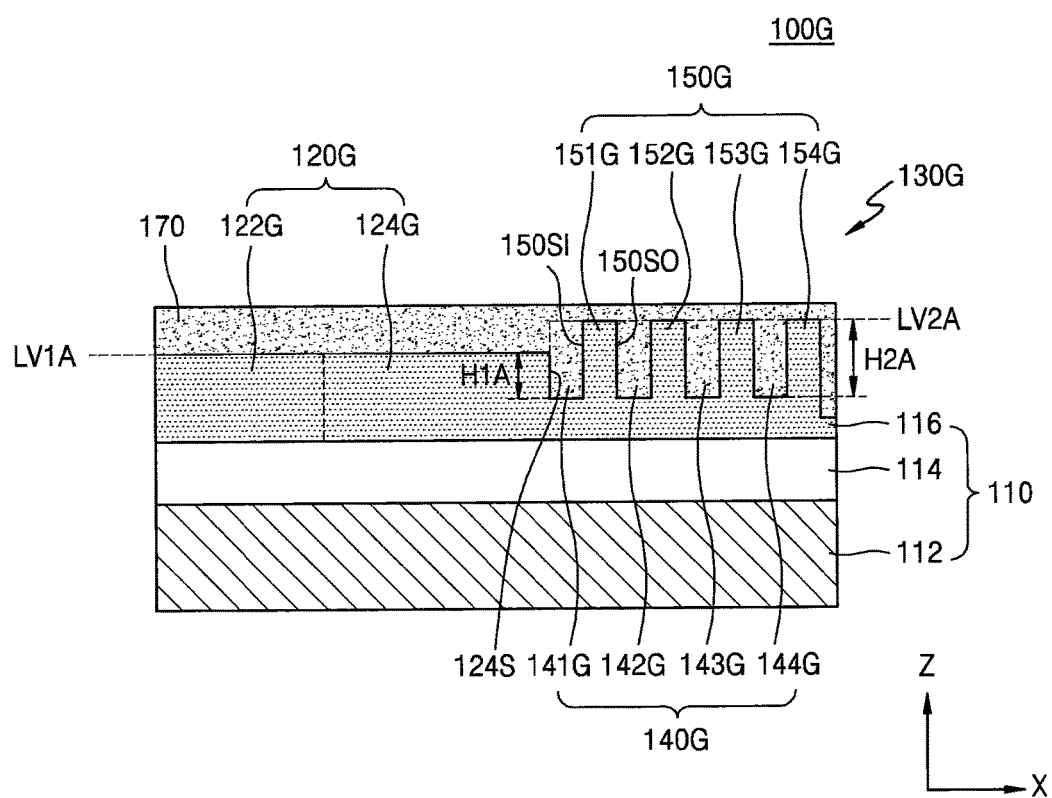
FIG. 14 is a cross-sectional view of an optical apparatus according to example embodiments.

FIG. 14 is a cross-sectional view of an optical apparatus 100G according to example embodiments. FIG. 14 is equivalent to a cross-sectional view taken along a line of FIG. 1. In FIG. 14, the same reference numerals are used to denote the same elements as in FIGS. 1 to 11 and thus, detailed descriptions thereof may be omitted in the interest of brevity.

Referring to FIG. 14, a top level LV1A of the optical waveguide 120G may be lower than a top level LV2A of a grating pattern 130G. A lower sidewall of a low refractive index portion 141G, which is closest to a taper portion 124G from among a plurality of low refractive index portions 140G, may be in contact or coincide with a sidewall 124S of the taper portion 124G. The sidewall 124S of the taper portion 124G may have a first height H1A. Inner sidewalls 150SI or outer sidewalls 150SO of the plurality of high refractive index portions 150G may have a second height H2A greater than the first height H1A.

In example embodiments, the first height H1A of the taper portion 124G may range from about 20 nm to about 200 nm, and the second height H2A of the plurality of high refractive index portions 150G may range from about 20 nm to about 400 nm. However, the first height H1A and the second height H2A are not limited thereto.

Although not shown in FIG. 13, each of the optical waveguide 120G and the grating pattern 130G may have the layout corresponding to at least one of the optical apparatuses 100, 100A, 100B, 100C, 100D, 100E, and 100F described with reference to FIGS. 1 to 12. That is, the sidewall 124S of the taper portion 124G or at least one inner sidewall 150SI or at least one outer sidewall 150SO of the plurality of high refractive index portions 150 may have a second focus position (refer to FP2 in FIG. 2) that is different from a first focus position (refer to FP1 in FIG. 2). Furthermore, at least one inner sidewall 150SI or at least one outer sidewall 150SO of the plurality of high refractive index portions 150 may have a third focus position (refer to FP3 in FIG. 11) that is different from the second focus position FP2.

A protection layer 170 may be located on the optical waveguide 120G and the grating pattern 130G. In example embodiments, the protection layer 170 may include silicon oxide (SiOx). The protection layer 170 may be integrally formed with the plurality of low refractive index portions 140G, but the inventive concept is not limited thereto. As shown in FIG. 13, the protection layer 170 may cover the entire grating pattern 130G. When an optical fiber 160 is misaligned with the grating pattern 130G on the grating pattern 130G, the protection layer 170 may help prevent the grating pattern 130G from being damaged due to physical contact with the optical fiber 160.

In other example embodiments, the protection layer 170 may include air. In this case, a top surface of the optical waveguide 120G and the sidewalls 150SI and 150SO of the plurality of high refractive index portions 150G may be exposed to air.

As shown in FIG. 13, since the first height H1A of the taper portion 124G is smaller than the second height H2A of the plurality of high refractive index portions 150G, when an optical signal is transmitted from the optical waveguide 120G to the grating pattern 130G, a relatively small variation in dimension and a relatively low index contrast may occur at an interface between the taper portion 124G and the grating pattern 130G. Accordingly, occurrence of back reflection between the optical waveguide 120G and the grating pattern 130G may be reduced, and optical loss caused by a sharp mode-mismatch may be reduced.

In a process of forming the optical apparatus 100G according to an example embodiment, a semiconductor layer 116 having a first top level LV1A may be etched by using an etch mask (not shown) to form the sidewall 124S of the taper portion 124G and lower portions of the sidewalls 150SI and 150SO of the plurality of high refractive index portions 150G. In this case, the plurality of high refractive index portions 150G may have a top level that is substantially the same as the first top level LV1A. Also, the sidewalls 150SI and 150SO of the plurality of high refractive index portions 150G may have substantially the same height as the first height H1A of the sidewall 124S of the taper portion 124G. Thereafter, a top surface of the taper portion 124G may be covered with a growth stop layer. An epitaxial growth process may be performed by using portions of the plurality of high refractive index portions 150G, which are not covered with the growth stop layer, as a template so that the plurality of high refractive index portions 150G may be grown to the second height H2A. After the epitaxial growth process, a second top level LV2A of the plurality of high refractive index portions 150G may be higher than the first top level LV1A of the taper portion 124G. Subsequently, the growth stop layer may be removed.

Figure 15A:
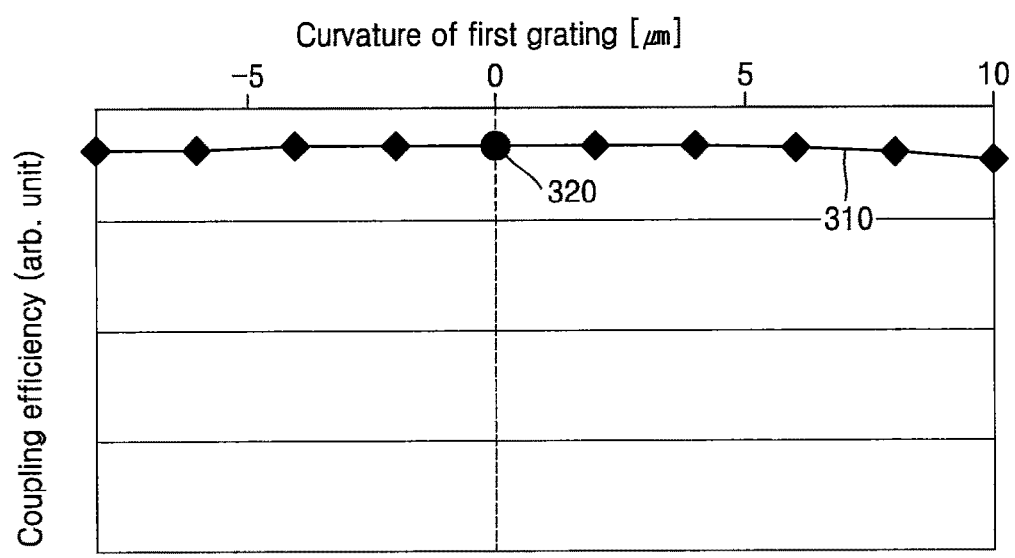
FIGS. 15A and 15B are graphs showing simulation results of an optical apparatus according to example embodiments.
Figure 15B:
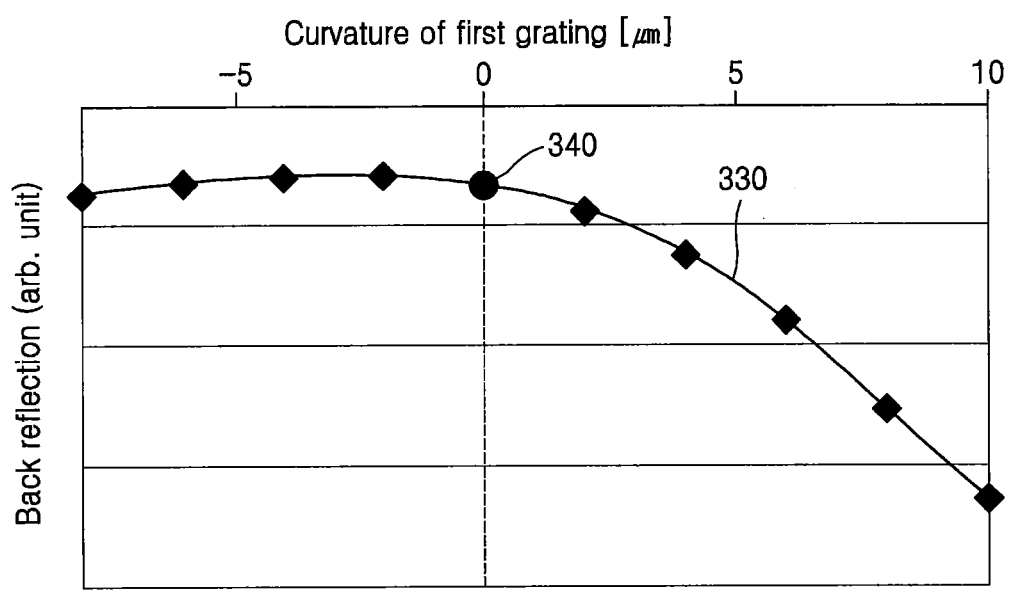

FIGS. 15A and 15B are graphs showing simulation results of an optical apparatus according to example embodiments.

Specifically, FIG. 15A is a graph of coupling efficiency relative to a curvature of a grating pattern, and FIG. 15B is a graph of back reflection relative to a curvature of a grating pattern.

Referring to FIG. 15A, it may be confirmed that coupling efficiency of an experimental example 310 in which a curvature of a grating pattern varied was reduced to some extent as compared with coupling efficiency of a comparative example 320 in which a curvature of a grating pattern did not vary. However, even if the curvature of the grating pattern varied by as much as 10 μm, a difference in coupling efficiency between the experimental example 310 and the comparative example 320 was slight.

Referring to FIG. 15B, it can be confirmed that back reflection of an experimental example 330 in which a curvature of a grating pattern varied was markedly reduced as compared with back reflection of a comparative example 340 in which a curvature of a grating pattern did not vary. In particular, in the experimental example 330 in which the curvature of the grating pattern varied by as much as 10 μm, as the curvature of the grating pattern increased (or as the first distance (refer to D1 in FIG. 2) between the first focus position FP1 and the second focus position FP2 increased), back reflection was gradually reduced.

Based on the simulation results shown in FIGS. 15A and 15B, it can be confirmed that in the experimental examples 310 and 330 in which curvatures of grating patterns varied, coupling efficiency was reduced to some extent but not greatly reduced, while back reflection was considerably reduced.

Figure 16:
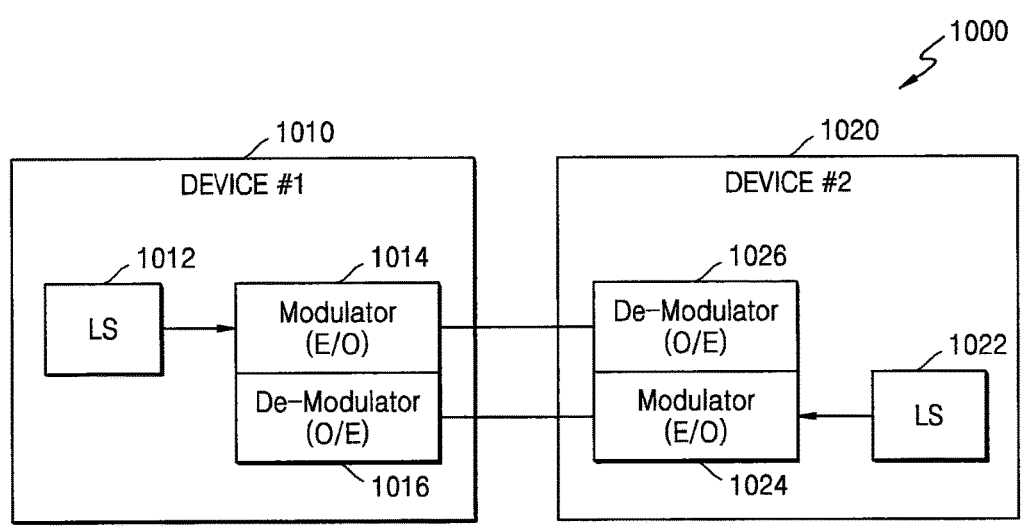
FIG. 16 is a block diagram of an optical integrated circuit (IC) according to example embodiments.

FIG. 16 is a block diagram of an optical IC 1000 according to example embodiments.

Referring to FIG. 16, the optical IC 1000 may include a first device 1010 and a second device 1020. The first device 1010 and the second device 1020 may communicate optical signals via serial communication.

The first device 1010 may include a first light source 1012, a first optical modulator 1014, and a first optical demodulator 1016. The first light source 1012 may output an output signal having a continuous wave. The first light source 1012 may be an optical device, such as a laser diode (LD). The first optical modulator 1014 may perform an electrical-to-optical conversion operation. The first optical modulator 1014 may include an optical input/output (I/O) portion and a phase shifter. The optical I/O portion may receive an unmodulated input optical signal and transmit the optical signal to the optical waveguide. The phase shifter may modulate a phase of the optical signal transmitted to the optical waveguide and output a phase modulation signal. The first optical modulator 1014 may include at least one of the optical apparatuses 100, 100A, 100B, 100C, 100D, 100E, 100F, and 100G described with reference to FIGS. 1 to 14. The first optical demodulator 1016 may perform an optical-to-electrical conversion operation. The first optical demodulator 1016 may receive and demodulate an optical signal output by the second optical modulator 1024 of the second device 1020 and output a demodulated electric signal.

The second device 1020 may include a second light source 1022, a second optical modulator 1024, and a second optical demodulator 1026. The second light source 1022 may output an optical signal having a continuous wave. The second optical modulator 1024 may include at least one of the optical apparatuses 100, 100A, 100B, 100C, 100D, 100E, 100F, and 100G described with reference to FIGS. 1 to 14. The second optical demodulator 1026 may receive and demodulate an optical signal output by the first optical modulator 1014 of the first device 1020 and output a demodulated electric signal.

While the inventive concept has been particularly shown and described with reference to example embodiments thereof, it will be understood that various changes in form and details may be made therein without departing from the spirit and scope of the following claims.

What is claimed is:

1. An optical apparatus comprising:
   an optical waveguide located on a substrate and including a guiding portion and a taper portion; and
   a grating pattern located on the substrate, wherein the taper portion is between the guiding portion and the grating pattern,
   wherein the grating pattern comprises a plurality of low refractive index portions and a plurality of high refractive index portions alternately arranged in a first direction parallel to a top surface of the substrate, and each of the plurality of high refractive index portions comprises a curved inner sidewall and a curved outer sidewall having curvatures defined by circular paths,
   the curved inner sidewall and the curved outer sidewall of at least one of the plurality of high refractive index portions have a first focus position, and the curved inner sidewall or the curved outer sidewall of at least one of the plurality of high refractive index portions or a sidewall of the taper portion has a second focus position that is different from the first focus position, and
   a first low refractive index portion from among the plurality of low refractive index portions is closest to the taper portion, the first low refractive index portion has a first width in the first direction at a center of the first low refractive index portion, the first low refractive index portion has a second width in the first direction at an edge of the first low refractive index portion, and the second width is substantially greater than the first width.

2. The optical apparatus of claim 1, wherein the first focus position is located at an interface between the guiding portion and the taper portion, and the second focus position is located in the taper portion.

3. The optical apparatus of claim 1, wherein the first focus position is located at an interface between the guiding portion and the taper portion, and the second focus position is located in the guiding portion.

4. The optical apparatus of claim 1, wherein a second width of a portion of the taper portion, which is closer to the grating pattern than to the guiding portion, is greater than a first width of a portion of the taper portion, which is closer to the guiding portion than to the grating pattern, and the sidewall of the taper portion is curved.

5. The optical apparatus of claim 1, wherein the sidewall of the taper portion is in contact or coincides with a sidewall of the first low refractive index portion.

6. The optical apparatus of claim 1, wherein the sidewall of the taper portion has the second focus position.

7. The optical apparatus of claim 1, wherein the sidewall of the taper portion has the second focus position, and
the curved inner sidewall of a high refractive index portion which is closest to the taper portion from among the plurality of high refractive index portions has the second focus position.

8. The optical apparatus of claim 1, wherein the curved inner sidewall or the curved outer sidewall of the at least one of the plurality of high refractive index portions or the sidewall of the taper portion has a third focus position that is different from the first focus position and the second focus position.

9. The optical apparatus of claim 8, wherein the second focus position and the third focus position are located in the taper portion.

10. The optical apparatus of claim 8, wherein the second focus position is located in the taper portion, and the third focus position is located in the guiding portion.

11. The optical apparatus of claim 8, wherein the first to third focus positions are arranged in a straight line in the first direction.

12. The optical apparatus of claim 1, wherein the plurality of low refractive index portions comprise one of air and silicon oxide ($SiO_x$), and the plurality of high refractive index portions comprise silicon.

13. The optical apparatus of claim 1, wherein the taper portion has a first length in the first direction, and
a first distance between the first focus position and the second focus position is less than about 80% of the first length of the taper portion.

14. The optical apparatus of claim 1, wherein a top surface of the grating pattern is located at a same level as a top surface of the optical waveguide.

15. An optical apparatus comprising:
an optical waveguide on a substrate and comprising a guiding portion having a centerline defining a first direction and a taper portion comprising a curved sidewall;
a grating pattern on the substrate, wherein the taper portion is between the guiding portion and the grating pattern,
wherein the grating pattern comprises a plurality of low refractive index portions and a plurality of high refractive index portions alternately arranged in the first direction, and each of the plurality of high refractive index portions comprises a curved inner sidewall and a curved outer sidewall, and
at least one curved inner sidewall and at least one curved outer sidewall of at least one of the plurality of high refractive index portions define a first focus position at a radius of curvature thereof and the sidewall of the taper portion defines a second focus position that is spaced apart from the first focus position at a radius of curvature thereof.

16. The optical apparatus of claim 15, wherein the curved inner sidewall and the curved outer sidewall of each of the plurality of high refractive index portions define the first focus position, and wherein the first focus position is located at an interface between the guiding portion and the taper portion.

17. The optical apparatus of claim 16, wherein the second focus position is located either in the guiding portion or in the taper portion.

18. The optical apparatus of claim 15, wherein the curved inner sidewall of a high refractive index portion that is closest to the taper portion from among the plurality of high refractive index portions also defines the second focus position at a radius of curvature thereof.

19. The optical apparatus of claim 18, wherein the first focus position is located at an interface between the guiding portion and the taper portion, and wherein the second focus position is located in the taper portion.

20. An optical apparatus comprising:
an optical waveguide located on a substrate and comprising a guiding portion and a taper portion comprising a curved sidewall; and
a grating pattern located on the substrate, wherein the taper portion is between the guiding portion and the grating pattern,
wherein the grating pattern comprises a plurality of low refractive index portions and a plurality of high refractive index portions alternately arranged in a first direction parallel to a top surface of the substrate, and each of the plurality of high refractive index portions comprises a curved inner sidewall and a curved outer sidewall,
at least one curved inner sidewall and at least one curved outer sidewall of at least one of the plurality of high refractive index portions have a first focus position, the first focus position is located at an interface between the guiding portion and the taper portion, and the sidewall of the taper portion has a second focus position that is spaced apart from the first focus position, and
the second focus position is located in one of the guiding portion and the taper portion.

* * * * *